Feb. 20, 1923.                                                                1,445,754.
H. J. CASEY.
ROAD TRACTOR.
FILED DEC. 4, 1920.                                               3 SHEETS—SHEET 1.
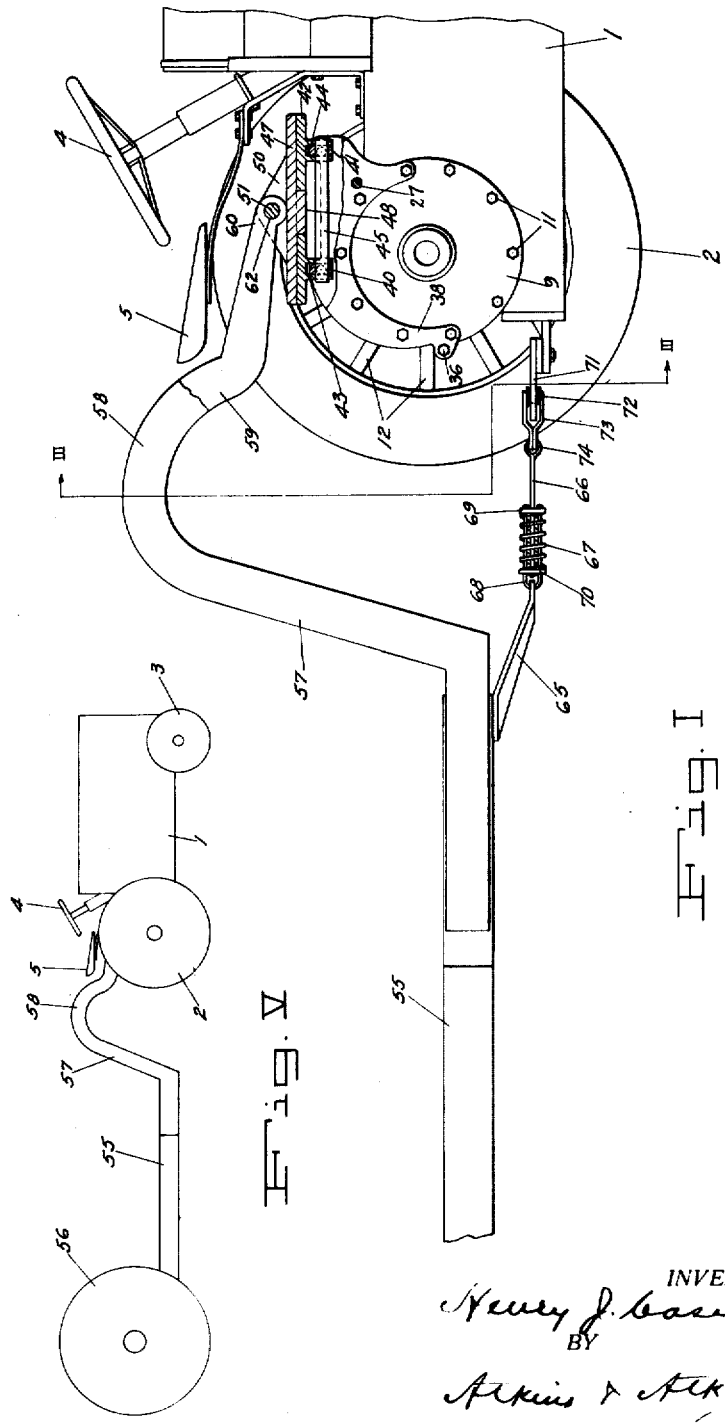
INVENTOR:
Henry J. Casey,
BY
Atkins & Atkins,
ATTORNEYS.

Feb. 20, 1923.
H. J. CASEY.
ROAD TRACTOR.
FILED DEC. 4, 1920.
1,445,754.
3 SHEETS—SHEET 2.
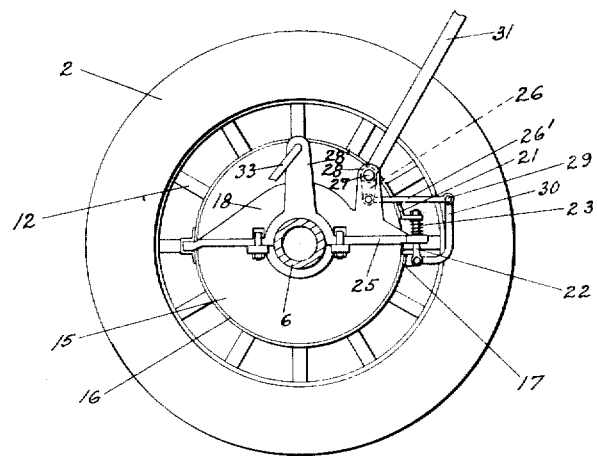
Fig. II
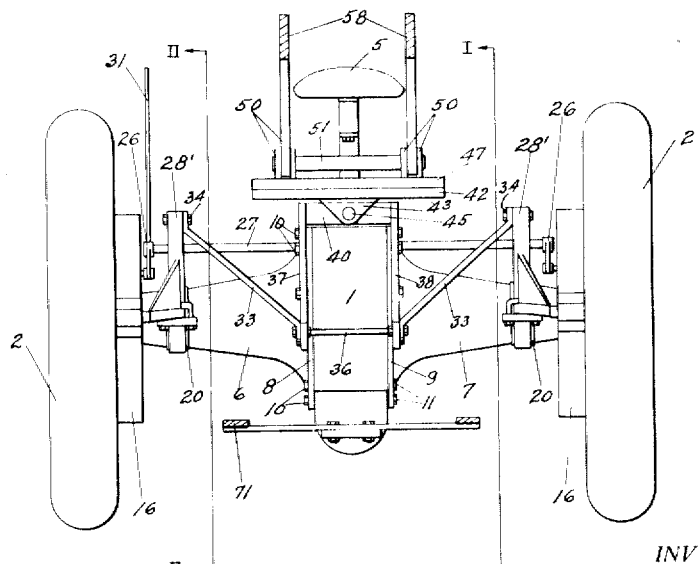
Fig. III
INVENTOR:
Henry J. Casey,
BY
Atkins & Atkins,
ATTORNEYS.

Feb. 20, 1923.
H. J. CASEY.
ROAD TRACTOR.
FILED DEC. 4, 1920.
1,445,754.
3 SHEETS—SHEET 3.
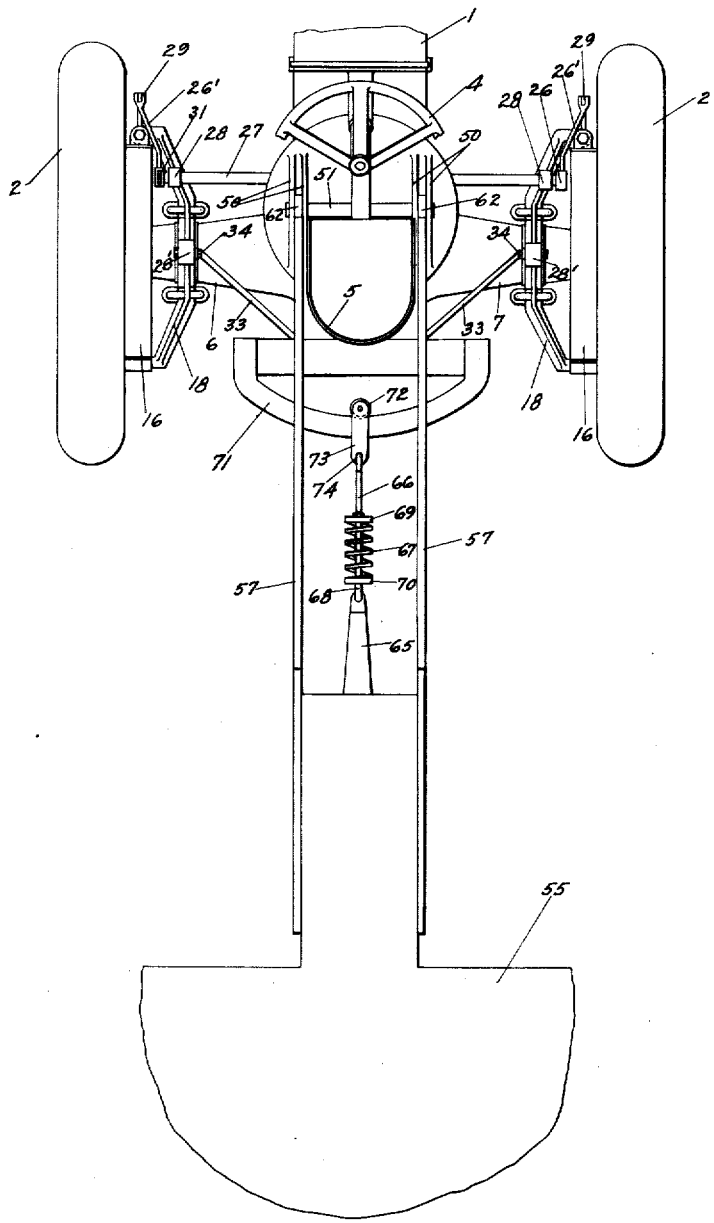
Fig. IV
INVENTOR:
Henry J. Casey
BY
Atkins & Atkins
ATTORNEYS.

Patented Feb. 20, 1923.

1,445,754

UNITED STATES PATENT OFFICE.

HENRY J. CASEY, OF PORTLAND, OREGON.

ROAD TRACTOR.

Application filed December 4, 1920. Serial No. 428,254.

*To all whom it may concern:*

Be it known that I, HENRY J. CASEY, a citizen of the United States of America, and resident of city of Portland, in the county of Multnomah, in the State of Oregon, have invented certain new and useful Improvements in Road Tractors, of which the following is a specification, reference being had to the accompanying drawings.

My invention relates to road tractors, and has for its main object the production of an auto-truck in which provision is made for simplicity, economy, and cheapness in construction, for facility of operation, and for distribution of the weight of the load, to advantage both to the machine and to the roadbed.

My invention may be regarded either as a six-wheel truck, which in its entirety it is, or, as a unitary truck comprising two parts, a forward or tractor portion, flexibly united to a rearward or trailer portion.

By reason of certain qualities, including compactness, simplicity, cheapness and steering facilities, tractors of the "Fordson" type possess distinctive practical advantages and are entirely serviceable for plowing operations or the like, wherein the drag of the load is below the level of the tread of the tractor wheels; but the very principle of their operation which renders them serviceable for plowing, disqualifies them for the drawing of loads when carried above the said level, as, for example, upon a wheeled trailer in the rear of the tractor.

The reason will be obvious from consideration of the following reference to the principle of operation above referred to.

When a "Fordson" tractor is hitched to a plow, the draft upon the plow follows the line of a bent lever beginning at the toe of the plowshare and terminating at the forward end of the tractor. In such case, the driving wheels, located approximately at the angle of the said bent lever, are always drawn towards the earth and into gripping engagement therewith by the oblique downward pull of the plowshare. At the same time, the said downward pull has a tendency to lift the forward or steering end of the tractor. The operation of the driving wheels also contributes towards the same end. The consequent effect is to maintain a substantially uniform load upon the guiding wheels, not only without impairment but with increase, within certain limits, of the purchase upon the ground of the tractor wheels which propel the machine. There is, however, even in plowing, a weight of load, say 2500 pounds, beyond which the front wheels will leave the ground and cease to functionate.

Attempts to exceed the use of the tractor to road service by hitching it directly to a wheeled trailer have proven unsatisfactory, for the reason that the down-pulling load of the plow being lost, either the driving wheels, although equipped with rubber tires, fail adequately to functionate in consequence of their diminished purchase upon the ground, or, they lift the guiding wheels from the ground before said driving wheels develop adequate pulling power upon the loaded trailer. That result may be accounted for by the fact that if the trailer axle be higher than that of the driving wheels, the effect will be to apply driving power at the angle of an inverted bent lever with the result that the operation of the driving wheels will tend to straighten the lever and thereby to lift the driving wheels out of contact with the roadbed and cause them to slip thereon without driving effect. The obvious remedy in such a case would appear to be to lower the trailer axle, but it is found that if that be done, the lifting tendency upon the guiding wheels will then be so augmented as to disqualify them from functioning before the driving wheels can do their work. The remedy I have found effectually is to impose excessive weight on the guiding wheels, and preferably to provide means for imposing a portion of the weight of the trailer load upon the tractor between its front and rear wheels, said means being adapted to avoid any interruption of the pulling power of the tractor upon the trailer.

By my invention, provision is accordingly made so to combine a trailer and a tractor as to remove the tendencies referred to, and thereby to maintain, under such varied conditions as may occur in service, the traction efficiency of the machine.

In accomplishing the aforesaid main object of my invention, numerous minor problems are presented for solution, and my invention is devised to that end as hereinafter set forth.

What constitutes my invention will be hereinafter specified in detail and succinctly set forth in the appended claims.

In the accompanying drawings:

Figure I is a side elevation, partly in section, on the lines I—I of Figure III, the rear of the trailer and the front of the tractor proper being cut away.

Figure II is a vertical section on the line II—II of Figure III, looking in the direction of the arrows.

Figure III is a vertical section on the line III—III of Figure I, looking in the direction of the arrows.

Figure IV is a top plan view of the subject matter shown in Figure I.

Figure V is a view on a reduced scale, showing a diagrammatic side elevation of my tractor in complete form of embodiment.

Referring to the numerals on the drawings, 1 indicates the body, 2 the rear or driving wheels, and 3 the front or guiding wheels of a tractor proper. The wheels 3 are controlled by the operation, in any usual or preferred manner, of a steering wheel 4 in operative proximity to a driver's seat 5. In this specification I include both the wheels 2 and 3 under the term "driving mechanism."

The elements above enumerated may be of any usual or preferred type and in the form presented by way of example, represent the several elements indicated, in that combination known to the trade as a "Fordson" tractor. Said combination includes a rear axle case which, in usual form of embodiment, embraces two tapered sections 6 and 7 having at their larger ends, respectively, annular flanges 8 and 9, which, as by a crown of bolts 10 and 11 are fastened upon the opposite sides of the body 1.

On the hubs, respectively, of preferably cushion tire wheels 2, I prefer to provide, securely and preferably integrally fastened to said respective hubs and spokes 12, a brake drum 15, about which is bent a brake strap 16. One end 17 of each brake strap is secured to and supported by a frame 18 of which there are two, one mounted on the axle section 6 and the other on the axle section 7, as by collars 20 encircling the same, respectively. The end 21 of the brake strap opposite its end 17 is movably brought around the drum 15 towards the end 17 and is operatively joined thereto as by a link in pin 22. A relief spring 23 interposed between the end 21 and a cross-bar 25 of the supporting frame 18, serves to keep the ends 17 and 21 normally separated. Both straps 16 are actuated, preferably simultaneously, by suitable mechanism as, for example, crank-arms 26 carried upon opposite ends, respectively, of a cross shaft 27 mounted in bearing uprights 28 provided for it upon the respective frames 18. Crank-arms 26' are pivoted, as indicated at 29, to links 30. A brake lever 31 serves to impart rocking motion to the shaft 27, and thereby, through the arms 26 and 26' and the links 30, operatively to actuate the respective brake straps.

Brace rods 33 are bolted, as indicated at 34, to the uprights 28', and are united by a cross bolt 36 to supporting plates 37 and 38 secured against the flanges 8 and 9, respectively, to which their connection is completed by a part of the crowns of bolts 10 and 11.

The combination of the uprights 28' through the brace rods 33 by means of the cross bolt 36 which unites them, constitutes a strong truss for the support of the uprights and their frames, and to resist any spreading strain that may tend to separate the flanges 8 and 9. The resistance to spreading strain referred to is an important structural feature of my invention in view of the load which the plates 37 and 38 are required in practice to carry, as hereinafter specified.

Between the plates 37 and 38 are secured cross-pieces 40 and 41, designed and adapted for the support of a gimbal joint connection, preferably constituted as specified in the description immediately following. A table 42 is provided on its under side with two pairs of spaced lugs 43 and 44, whereof each pair straddles a cross-piece 40 or 41 to which the lugs are pivotally united as by a common pivot-bar 45. The table 42 is surmounted by an abutment plate 47 of transverse dimensions corresponding to the table 42. The members 42 and 47 are pivoted on a vertical axis centrally disposed to said members as by a cylindrical stud 48 projecting from the bottom of the member 47 and fitted to a central aperture in the table 42 to the bottom of which the depending free end of the stud is preferably made flush. The top of the member 47 is preferably provided with two pairs of spaced lugs 50 through apertures in which is passed diametrically across the plate 47 a common pivot bar 51. The bars 51 and 45 are located at right angles to each other and afford means for effecting corresponding rocking movement to the members united by them, the longitudinal axes of said bars being located in planes coincident with the vertical axis of the cylindrical lug 48. The pivotal connections afforded by the bars 45 and 51 and the lug 48 contribute to constitute the gimbal joint connection above referred to.

For accomplishment of the objects of my invention, I apply, in some suitable manner, an excess weight upon the wheels 3. The means preferred are to locate the bar 51 in a vertical plane disposed between the driving and guiding wheels of the tractor proper, with the effect, as will presently be shown, of disposing to advantage a portion of the weight of the trailer load upon the tractor proper.

The positioning of the bar 51 determines the proportion of the weight of the trailer load that is distributed to the tractor proper, as I shall now proceed to explain.

Accordingly, 55 indicates a trailer of any suitable and preferred construction, comprising a single pair of rearmost wheels 56. The body of the trailer comprehends one and preferably two coupling members 57 by which the trailer may be hitched to the tractor proper. I prefer to provide each member 57 with a bend 58, somewhat resembling in shape an inverted U, and because of their shape, when so constructed, I designate said members, specifically, as "goose-necks." The downwardly extending portion 59 of each goose-neck preferably ends in a terminal 60 that is in service approximately of horizontal disposition. The terminals 60 if, as preferred, they are two in number, are pivotally connected, as indicated at 62, to the bar 51. By such means a flexible connection of the kind called "universal" is effected between the trailer and traction portions of my truck through the gimbal joint whereof the bar 51 is a part, whereby the motion of said respective portions, due to inequalities of the surface over which the vehicle travels or to other causes, are made independent one of another.

For coupling the trailer portion of my truck to the tractor portion thereof, I prefer to employ, in addition to the member or members 57, a direct hitch, comprising, preferably, a tongue 65 firmly secured to the trailer frame and connected to a draw-bar 66 flexibly fastened to the rear end of the tractor frame. I prefer to make the draw-bar 66 yieldingly extensible as by the operative introduction into it of a spring 67. To that end the spring 67 is made in the form of a spring resistant compressible coil wound around an elongated clevis 68 that is provided with a terminal fixed plate 69 against which one end of the spring 67 bears. The other end of the spring 67 engages a bearing plate 70 that works back and forth on the clevis and is secured to the end of the draw-bar 66. The length of the hitch between the trailer and the tractor is such as to compel the initial pull exerted by the tractor on the trailer to come upon the member or members 57, thereby first causing them to functionate. Afterward the pull is communicated directly through the hitch, thereby relieving the member or members 57 of excessive strain without impairing in any wise their load distributing function.

I prefer to connect the draw-bar 66 to the tractor through the mediation of a sector bar 71 acting as a track for a trolley 72 that is carried by a trolley frame 73 pivoted as indicated at 74 to the draw-bar 66. The operation of my machine may be described as follows. The driver seated upon the seat controls the operations of the truck in the usual manner. Under the forward drive of the wheels 2 driving motion is first imparted to the tractor portion of the machine which is imparted through the coupling members or goose-necks 57 to the trailer. The goose-necks perform two important functions. One is, by reason of their bends 58 rising above the tops of wheels 2, to afford complete flexibility, so far as service may require, in a generally horizontal plane. By this provision the machine may make turns to right or left, backward or forward, in very nearly as small a space as that which the tractor proper separated from the trailer would require for its operation.

The more important function of the goose-necks 57 is to distribute a part of the weight of the trailer load to the tractor with the effect, as already explained, of holding the front or guiding wheels 3 of the tractor in operative contact with the ground while the driving wheels 2 are doing their work, but without imposing upon the wheels 3 a load which might render them unmanageable through manipulation of the steering wheel 4. The said function is accomplished in part in the manner already specified, but the effect is aided and the result desired is assured by the twofold connection between the trailer 55 and the tractor proper of my machine. Said twofold connection includes that which unites the member or members 57 to the tractor for the one part, and the drawbar 66 and parts thereto appurtenant, for its other part. That part of said connection first above indicated is, as shown in Figure I, disposed above the driving axle and in a vertical plane in front of said axle, while the other part of said connection, namely the drawbar 66, is disposed below and in the rear of said axle. Consequently the driving torque of the tractor applies upon the member or members 57 a pushing force that has, while the machine is in motion, a constant tendency to depress the wheels 3. Due to the fact that the connection of the trailer and the tractor is above and in front of the driving axle, the load of the trailer is distributed between the front and rear wheels, and, therefore, tends to counteract any tendency of the torque to raise the front wheels of the tractor. The connection constituted by the draw bar 66 below and through the rear of the driving axle serves to offset any tendency of the torque to raise the front wheels.

As specified, the distribution of the trailer load may be varied by shifting of the vertical plane in which the pivot bar 51 is located. The said distribution continues at all times in service to be effected through the goose-necks 57, despite the direct hitch provided through the draw-bar 66 and its connections, which is operative only to insure against excess strain upon the goose-necks.

What I claim is:

1. In a road tractor, the combination with a wheeled tractor portion provided with a driving axle and guiding wheels, and a trailer provided with rearmost wheels, of flexible twofold means of connection between said two portions, one part of said connection being applied above and in front of the driving axle, and the other part of said connection being applied in the rear of and below the driving axle, with the resultant effect specified of keeping the guiding wheels always at normal engagement with the ground.

2. In a road tractor, the combination with a wheeled tractor portion provided with front guiding wheels and a driving axle, of a trailer provided with rearmost wheels, a connecting bar extending forwardly and upwardly from said trailer, said bar having a portion adjacent its end extending downwardly to form a "gooseneck," said bar being connected to said tractor portion above and in front of the driving axle to distribute the trailer load between the driving axle and the guiding wheels, and a second connection between said tractor portion and the trailer applied in the rear of and below the driving axle, whereby the pulling force of said first-mentioned connection is opposed with the resultant effect of keeping the guiding wheels always at normal engagement with the ground.

3. In a road tractor, the combination with a wheeled tractor portion provided with a driving axle and guiding wheels, and a trailer provided with rearmost wheels of flexible twofold means of connection between said two portions, one part of said connection being applied substantially above the driving axle, and the other part of said connection being applied in the rear of and below the driving axle, with the resultant effect specified of keeping the guiding wheels always at normal engagement with the ground.

In testimony whereof, I have hereunto set my hand in the presence of two subscribing witnesses.

HENRY J. CASEY.

Witnesses:
JOHN B. CLELAND,
LEICESTER B. ATKINS.

Certificate of Correction.

It is hereby certified that in Letters Patent No. 1,445,754, granted February 20, 1923, upon the application of Henry J. Casey, of Portland, Oregon, for an improvement in "Road Tractors," errors appear in the printed specification requiring correction as follows: Page 1, line 63, for the word "exceed" read *extend*, line 89, for the word "functioning" read *functionating*, and line 91, for "effectually" read *effectual;* page 2, line 57, strike out the word "in"; and that the said Letters Patent should be read with these corrections therein that the same may conform to the record of the case in the Patent Office.

Signed and sealed this 1st day of May, A. D., 1923.

[SEAL.]

KARL FENNING,
*Acting Commissioner of Patents.*